(12) United States Patent
Kadel et al.

(10) Patent No.: US 12,430,254 B2
(45) Date of Patent: Sep. 30, 2025

(54) WEB BOT DETECTION VIA BEHAVIORAL ANALYSIS AND MACHINE LEARNING

(71) Applicant: Adobe Inc., San Jose, CA (US)

(72) Inventors: Jan Kadel, Hamburg (DE); Ritwik Sinha, Cupertino, CA (US)

(73) Assignee: Adobe Inc., San Jose, CA (US)

( * ) Notice: Subject to any disclaimer, the term of this patent is extended or adjusted under 35 U.S.C. 154(b) by 275 days.

(21) Appl. No.: 18/220,440

(22) Filed: Jul. 11, 2023

(65) Prior Publication Data

US 2025/0023911 A1 Jan. 16, 2025

(51) Int. Cl.

| | |
|---|---|
| G06F 12/0842 | (2016.01) |
| G06F 16/355 | (2025.01) |
| G06N 3/08 | (2023.01) |
| G06Q 40/06 | (2012.01) |
| H04L 9/40 | (2022.01) |
| H04L 41/16 | (2022.01) |

(52) U.S. Cl.
CPC ........ G06F 12/0842 (2013.01); G06F 16/355 (2019.01); G06N 3/08 (2013.01); G06Q 40/06 (2013.01); H04L 41/16 (2013.01); H04L 63/1483 (2013.01)

(58) Field of Classification Search
CPC ........... G06F 12/0842; G06F 16/24552; G06F 9/453; G06F 16/355; G06N 20/20; G06N 20/00; G06N 3/08; G06N 7/01; G06N 5/01; G06N 3/045; G06Q 40/06; H04L 51/02; H04L 51/046
See application file for complete search history.

(56) References Cited

U.S. PATENT DOCUMENTS

| | | | |
|---|---|---|---|
| 2023/0196210 A1* | 6/2023 | Bustelo-Killam | G06N 3/08 706/12 |
| 2023/0351515 A1* | 11/2023 | Lane | G06Q 40/06 |
| 2024/0007421 A1* | 1/2024 | Mehta | G06F 16/355 |
| 2024/0119003 A1* | 4/2024 | Tobkin | G06F 12/0842 |

OTHER PUBLICATIONS

Best Captcha Solver, Available online at: https://bestcaptchasolver.com/, Accessed from internet on Oct. 6, 2022, 5 pages.

(Continued)

*Primary Examiner* — Kyung H Shin
(74) *Attorney, Agent, or Firm* — Kilpatrick Townsend & Stockton LLP

(57) ABSTRACT

Techniques for web bot detection using behavioral analysis and machine learning are disclosed. In an example method, a processing device receives an indication of a network interaction by a client agent, from which behaviors of the client agent can be determined. A heuristics module may classify the client agent as in an unknown class based on the behaviors of the client agent. A trained adversarial neural network may also classify the client agent as in the unknown class. The processing device then generates a graph representation of the network interaction. A trained graph convolutional neural network may classify the client agent as in a bot class using the graph representation. Based on the classification of the client agent as a bot, the processing device executes a command to cause a bot countermeasure and generates a notification including information about the behaviors of the client agent.

20 Claims, 10 Drawing Sheets

(56) References Cited

OTHER PUBLICATIONS

Developers in the World, Available online at: https://www.statista.com/statistics/627312/worldwide-developer-population/, Jun. 7, 2022, pp. 1-4.
How to install Java on Android, Available online at; https://www.whatismybrowser.com/guides/how-to-install-java/android, Accessed from internet on May 29, 2022, 1 page.
I'm (Really) Not a Robot: CAPTCHA Farms and Challenges of CAPTCHA Bot Detection, Available Online at https://datadome.co/learning-center/how-to-detect-captcha-farms-and-block-captcha-bots/, Feb. 27, 2022, 20 pages.
Java in Safari 12, Available online at: https://developer.apple.com/forums/thread/108643, May 29, 2022, 2 pages.
JavaScript Versions, Available online at: https://www.w3schools.com/js/js_versions.asp, Accessed from internet on May 17, 2022, 9 pages.
Launch a Windows Virtual Machine in Amazon Lightsail, Available online at: https://aws.amazon.com/de/getting-started/hands-on/launch-windows-vm/, Jun. 2, 2022, 14 pages.
Lecorpio, Available at: https://adobe.lecorpio.com/Runtime/EntityObject.aspx?TypeId=b7cc2b81-bd2c-4bdb-9901-9367df74dbbb&ObjectId=e45b1ea3-75b6-4c8a-9e96f266d845b348&AddToNavigationHistory=true&DashboardID=0992be4f-76e3-4742-adf4-32ec8b10ad98, 2015, 1 page.
NetworkX Graph Centrality Measures, Available online at: https://www.geeksforgeeks.org/network-centrality-measures-in-a-graph-using-networkx-python/, May 31, 2022, 13 pages.
NPAPI Deprecation: Developer Guide, Available online at: https://www.chromium.org/developers/npapi-deprecation/, Jan. 2014, 5 pages.
Number of Internet users, Available online at: https://www.statista.com/statistics/273018/numberof-internet-users-worldwide/, Jun. 7, 2022, pp. 1-4.
Recaptcha v2 vs. v3: Are They Really Efficient for Bot Protection?, Available online at: https://datadome.co/bot-management-protection/recaptchav2-recaptchav3-efficient-bot-protection/, Aug. 20, 2022, 23 pages.
ReCAPTCHA v3, Available Online at: https://developers.google.com/recaptcha/docs/v3, Aug. 8, 2022, 4 pages.
Service That Provides Realistic User Agents and Parsing for User Agents, Available online at: https://user-agents.net/, Accessed from internet on Oct. 6, 2022, pp. 1-2.
Udger, Available online at: https://udger.com, 2009-2023, 3 pages.
Was ist Content Scraping?, Cloudflare, Available online at: https://www.cloudflare.com/de-de/learning/bots/what-is-content-scraping/, Accessed from internet on Oct. 6, 2022, 5 pages.
Akrout et al., Hacking Google reCAPTCHA v3 using Reinforcement Learning, Available online at: arXiv:1903.01003v3 [cs.LG], Apr. 18, 2019, 5 pages.
Alarcon, Similarity in Graphs: Jaccard Versus the Overlap Coefficient, Available online at: https://developer.nvidia.com/blog/similarity-in-graphs-jaccard-versus-the-overlap-coefficient/, May 9, 2019, 6 pages.
Altmann et al., Permutation Importance: A Corrected Feature Importance Measure, Bioinformatics, vol. 26, No. 10, Apr. 12, 2010, pp. 1340-1347.
Brahimi, Create an Auto-Login Bot with Python and Selenium, Available online at: https://www.hongkiat.com/blog/automate-create-login-bot-python-selenium/, Accessed from internet on Apr. 6, 2023, 5 pages.
Brownlee, How to Implement a Semi-Supervised GAN (SGAN) From Scratch in Keras, Available online at: https://machinelearningmastery.com/semi-supervised-generative-adversarial-network/, Jul. 24, 2019, 56 pages.
Cabri et al., Online Web Bot Detection Using a Sequential Classification Approach, 2018 IEEE 20th International Conference on High Performance Computing and Communications; IEEE 16th International.Conference on Smart City; IEEE 4th International Conference on Data Science and Systems (HPCC/SmartCity/DSS), Jun. 2018, pp. 1536-1540.
Chu et al., Bot or Human? A Behavior-Based Online Bot Detection System, Springer International Publishing, From Database to Cyber Security, Nov. 30, 2018, pp. 432-449.
Deng et al., 3E-Solver: An Effortless, Easy-to-Update, and End-to-End Solver with Semi-Supervised Learning for Breaking Text-Based Captchas, Proceedings of the Thirty-First International Joint Conference on Artificial Intelligence (IJCAI-22), 2022, pp. 3817-3824.
Dhamnani et al., Botcha: Detecting Malicious Non-Human Traffic in the Wild, Available Online at: https://ceur-ws.org/Vol-2758/OHARS-paper4.pdf, 2020, pp. 51-59.
Egele et al., Captcha Smuggling: Hijacking Web Browsing Sessions to Create Captcha Farms, Proceedings of the 2010 ACM Symposium on Applied Computing, Available online at: https://doi.org/10.1145/1774088.1774483, Mar. 22, 2010, pp. 1865-1870.
Gilad, Handling Rare Categorical Values in Pandas, Available online at: https://medium.com/gett-engineering/handling-rare-categorical-values-in-pandas-d1e3f17475f0, Feb. 6, 2020, 15 pages.
Hossen et al., A Low-cost Attack Against the hcaptcha System, Available online at: https://arxiv.org/pdf/2104.04683.pdf, Apr. 10, 2021, pp. 422-431.
Howard et al., Algorithms, Bots, and Political Communication in the US 2016 Election: The Challenge of Automated Political Communication for Election Law and Administration, Journal of Information Technology and Politics, vol. 15, No. 2, Apr. 11, 2018, pp. 81-93.
Iliou et al., Web Bot Detection Evasion Using Generative Adversarial Networks, 2021 IEEE International Conference on Cyber Security and Resilience (CSR), Aug. 23-26, 2022, 10 pages.
Jackson, Brian, Web Crawlers and User Agents—Top 10 Most Popular, Available online at: https://www.keycdn.com/blog/web-crawlers, Jun. 16, 2017, 12 pages.
Jonker et al., Fingerprint Surface-Based Detection of Web Bot Detectors, European Symposium on Research in Computer Security, Sep. 2019, pp. 1-20.
Kaur et al., Captcha and Its Techniques : A Review, International Journal of Computer Science and Information Technologies, 2014, pp. 6341-6344.
Lin et al., Need Tickets? A Case Study of Bot-enabled Ticket Scalping, Available online at: https://www.csie.ntu.edu.tw/~hchsiao/pub/2017_eCrimeEU.pdf, 2017, 3 pages.
Luo et al., BotGraph: Web Bot Detection Based on Sitemap, Available online at: https://arxiv.org/pdf/1903.08074.pdf, Mar. 26, 2019, 7 pages.
Martinez et al., Taming the Cross Entropy Loss, German Conference on Pattern Recognition, Springer, Oct. 11, 2018, pp. 1-10.
Maynes, One Simple Action You Can Take to Prevent 99.9 Percent of Attacks on Your Accounts, Available online at: https://www.microsoft.com/security/blog/2019/08/20/one-simple-action-you-can-take-to-prevent-99-9-percent-of-account-attacks/, Aug. 20, 2019, 4 pages.
Mello, 'Scalper' Bots Hoarding Hottest Products from Consumers, Available online at: https://www.ecommercetimes.com/story/scalper-bots-hoarding-hottest-products-from-consumers-86945.html, Dec. 9, 2020, 10 pages.
Mohammadi et al., Detecting Cross-Site Scripting Vulnerabilities through Automated Unit Testing, IEEE International Conference on Software Quality, Reliability and Security (QRS), 2017, 2017, 10 pages.
Mohanty et al., Hand Labeling Considered Harmful, Available online at: https://www.oreilly.com/radar/arguments-against-hand-labeling/, Jun. 23, 2021, 11 pages.
Motoyama et al., Re: Captchas-Understanding Captcha-Solving Services in an Economic Context, USENIX Security'10: Proceedings of the 19th USENIX conference on Security, Aug. 11, 2010, pp. 1-18.
Odena, Semi-Supervised Learning with Generative Adversarial Networks, Available online at: https://arxiv.org/pdf/1606.01583.pdf, Oct. 22, 2016, 3 pages.
Rose et al., Automatic Keyword Extraction From Individual Documents, Text Mining: Applications and Theory, Mar. 2010, pp. 1-20.
Rumelhart et al., Learning Representations by Back-Propagating Errors, Nature, vol. 323, Oct. 9, 1986, pp. 533-536.

(56) References Cited

OTHER PUBLICATIONS

Salimans et al., Improved Techniques for Training GANs, Available Online at: arXiv preprint arXiv:1606.03498 (2016), Jun. 10, 2016, pp. 1-10.

Tanaka et al., Bot Detection Model Using User Agent and User Behavior for Web Log Analysis, Procedia Computer Science, vol. 176, 2020, pp. 1621-1625.

Vastel et al., FP-Crawlers: Studying the Resilience of Browser Fingerprinting to Block Crawlers, Available online at: https://inria.hal.science/hal-02441653, Jan. 16, 2020, 14 pages.

Wald, Sequential Tests of Statistical Hypotheses, Annals of Mathematical Statistics, vol. 16, No. 2, Jun. 1945, pp. 118-186.

Wang et al., Mining Web Navigation Patterns with a Path Traversal Graph, Expert Systems with Applications, vol. 38, No. 6, Jun. 2011, pp. 7112-7122.

Wang et al., Using Deep Learning to Solve Google reCAPTCHA v2's Image Challenges, 2020 14th International Conference on Ubiquitous Information Management and Communication (IMCOM), Jan. 1, 2020, pp. 1-5.

Wilbur et al., Click Fraud, Marketing Science, vol. 28, No. 2, Available online at: https://doi.org/10.1287/mksc.1080.0397, Oct. 24, 2008, 4 pages.

Xu et al., A Survey of Captcha Technologies to Distinguish Between Human and Computer, Neurocomputing, vol. 408, Sep. 30, 2020, pp. 1-53.

Ye et al., Yet Another Text Captcha Solver: A Generative Adversarial Network Based Approach, Proceedings of the 2018 ACM SIGSAC Conference on Computer and Communications Security, 2018, 17 pages.

Zeifman, Igal, Bot Traffic Report 2016, Incapsula, Available Online at https://www.imperva.com/blog/bot-traffic-report-2016/, Jan. 24, 2017, accessed Jul. 31, 2022, pp. 1-9.

Zhang et al., An End-to-End Deep Learning Architecture for Graph Classification, Proceedings of the AAAI Conference on Artificial Intelligence, vol. 32, No. 1, 2018, pp. 4438-4445.

\* cited by examiner

WEB BOT DETECTION VIA BEHAVIORAL ANALYSIS AND MACHINE LEARNING

TECHNICAL FIELD

This disclosure generally relates to web administration and, more specifically, to web bot detection using behavioral analysis and machine learning.

BACKGROUND

The modern web has broadened our horizons and made many extraordinary things possible: universal access to information, powerful search capabilities, instant communications, and more. With the growth of the web, however, has come inefficiencies that actors with dubious motives attempt to exploit using increasingly ingenious methods. The juxtaposition of the explosive growth of the web against those who would exploit those inefficiencies has wrought such now-common phenomenon as ad fraud, fake reviews, distributed denial-of-service (DDoS) attacks, content scraping, search engine manipulation, and so on. The result is a technological arms race pitting the engineers of legitimate actors against a murky world of the dark web, scripts, clicks or friends for sale and the like.

One such inefficiency relates to web bots. Web bots are software applications that perform automated tasks over the internet, often at a much higher rate than would be possible for a human. While some bots perform useful functions, such as indexing web pages for search engines, others can engage in malicious activities, like content scraping, DDOS, or spamming, thus posing significant challenges to cybersecurity and web infrastructure management. For some applications, web bots may be undesirable in most or all cases, whether benign or not. For administrators of web-based applications, the accurate identification of web bots is an important capability for effectively managing web resources and responding to security incidents.

SUMMARY

Some embodiments described herein relate to techniques for web bot detection via behavioral analysis and machine learning. In an example method, a processing device receives a first indication of a first network interaction by a client agent, in which the client agent includes one or more characteristics. The processing device determines, based on the first network interaction, one or more behaviors of the client agent. Based on a first classification of the client agent, a heuristics module makes a first determination that the client agent is in an unknown class, in which the first classification is based on the one or more characteristics of the client agent and the one or more behaviors of the client agent. A trained adversarial neural network, based on a second classification of the client agent, makes a second determination, that the client agent in the unknown class. The processing device then generates a graph representation of the first network interaction. A trained graph convolutional neural network, based on a third classification of the client agent and the first and second classifications of the client agent as in the unknown class, determines that the client agent is in a bot class, in which the third classification is performed using the graph representation of the first network interaction. Based on the third classification of the client agent as in the bot class, the processing device executes a command to cause a bot countermeasure and generates a notification comprising information about the one or more characteristics of the client agent and the one or more behaviors of the client agent.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
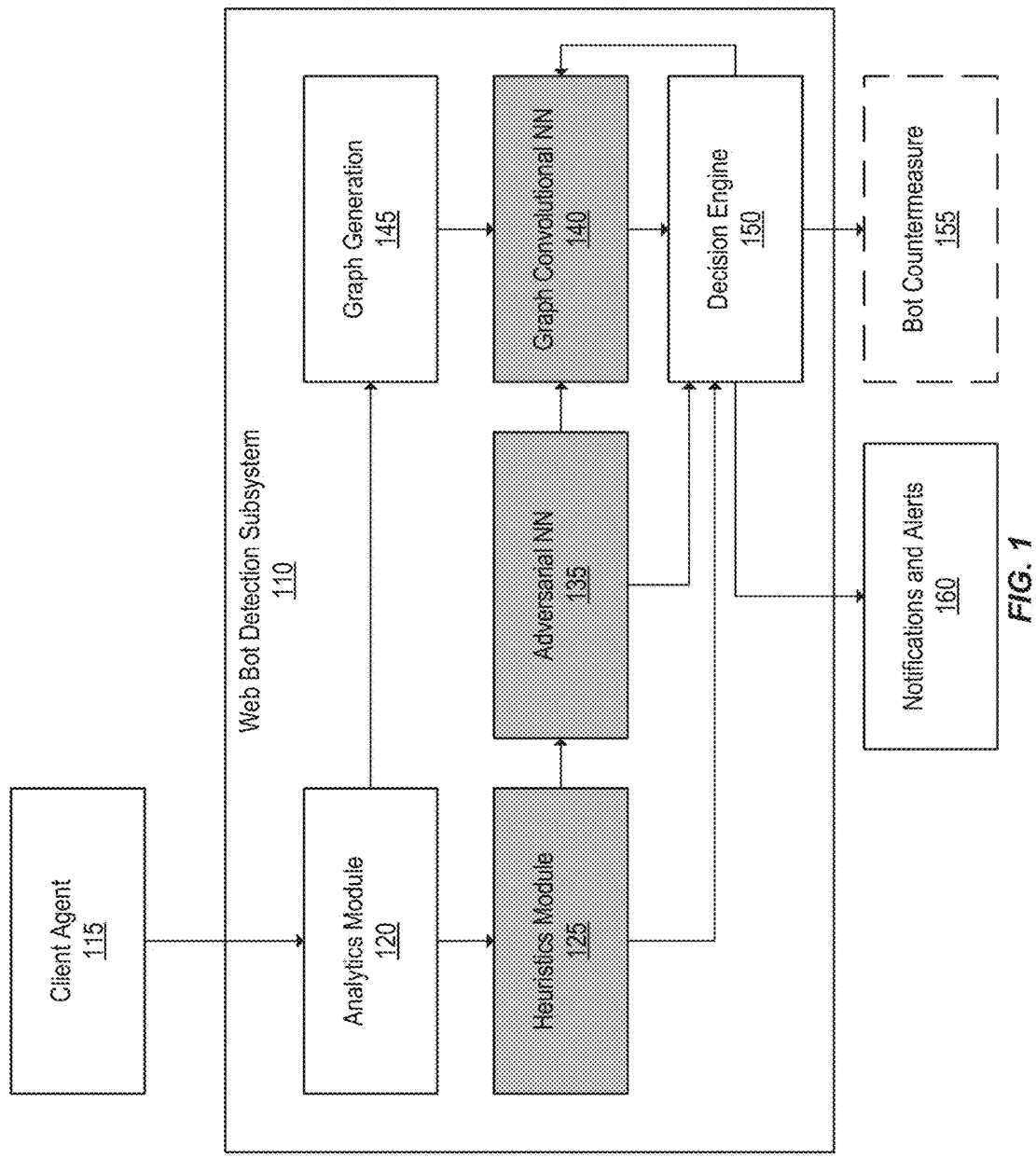
FIG. 1 is a diagram of an example system including a web bot detection subsystem for bot detection using behavioral analysis and machine learning, according to some embodiments of the present disclosure.

The growth of automation technology has kept pace with the growth of the modern web. For example, web bots may include software applications that perform automated tasks on the web. In some cases, web bots can be used for benign or repetitive tasks. For example, web bots like crawlers, spiders, and scrapers can be used to gather and index information. But even benign web bots can be an unwanted strain on web resources, increasing hosting costs or adversely affecting the user experience for some browsers.

Some web bots can be used for malicious purposes, such as conducting cyberattacks or content scraping without permission. Malicious bots can be a significant source of harm. For example, malicious web bots can be used for a variety of nefarious activities, including distributed denial-of-service (DDOS) attacks, data breaches, spamming, and click fraud. Such actions can result in significant financial losses for businesses that trickle down to consumers. For instance, click fraud can lead to inflated advertising costs, with advertisers paying for fake clicks that don't lead to actual customers. Likewise, DDOS attacks can disrupt web operations, leading to downtime, lost sales, or significant inconvenience. And unwanted scraping bots can steal proprietary data.

To combat these threats, various strategies are employed. For example, network-based anomaly detection can identify unusual patterns of traffic that may indicate a bot attack. Internet Protocol (IP)-based blocking can stop known malicious bots from accessing a site. Completely Automated Public Turing test to tell Computers and Humans Apart (CAPTCHAs) can help differentiate between human users and bots. However, despite the availability of some solutions for defeating web bots, the existing solutions are continuously maneuvered around in an arms race between the operators of legitimate web operations and those that abuse the public, open doors of the web. Moreover, many of the existing solutions, like CAPTCHAs, negatively impact the user experience by requiring unwanted and delaying web interactions.

These limitations can be addressed using techniques for web bot detection via behavioral analysis and machine learning. In an example method, a processing device includes a web bot detection subsystem that includes, among other components, a heuristics module, a semi-supervised generative adversarial network (SGAN), a deep graph convolutional neural network (DGCNN), and a decision engine. The web bot detection subsystem is configured to detect client agents that are web bots and to take actions to mitigate the negative impacts of those bots.

The system receives an indication of network interactions by a client agent. The client agent may be, for example, a human user's web browser or a Hypertext Transfer Protocol (HTTP) client executed in a script (i.e., a web bot). The client agent may perform network interactions like loading a webpage, either by typing the address of the webpage in a web browser or by executing program code from a script. Or the client agent may click a button, either by clicking the mouse button with a human finger or executing JavaScript code from a script.

The client agent may have several characteristics. For example, the system may determine certain client agent characteristics such as the client agent's source IP address, HTTP method, HTTP headers, or cookies. However, the system may only be able to obtain limited information about the client agent and may therefore have no easy way to determine whether the client agent is operated by a human or is a web bot on the basis of client agent characteristics alone.

The system can determine, based on the network interactions of the client agent, several behaviors of the client agent. For example, the system may include an analytics module. The analytics module can receive, for example, HTTP web data based on the network interactions of the client agent. The HTTP data may include logs or packet data including HTTP request information used to determine the client agent characteristics. The HTTP data can be sorted or classified into distinct events like loading a webpage, clicking a link, or submitting a form. The relationships between the events determine behaviors. For example, if a user makes a purchase from an e-commerce website in a series of network interactions, those interactions may be defined as a shopping behavior.

The system includes a heuristics module that classifies the client agent as a human, a web bot, or as unknown. The classification by the heuristics module may be based on the characteristics or behaviors of the client agent. For example, web requests sent by the client agent may include a number of standard HTTP headers such as "Content-Type," "User-Agent," "Authorization," and so on. The heuristics module can classify a client agent as a web bot if a characteristic like a forged "User Agent" header is identified, or certain keywords are found in the "User-Agent" header. Likewise, the heuristics module can classify a client agent as a web bot if a particular behavior is detected like nearly-identical time between actions, indicating a mechanical (i.e., scripted) client agent.

If the heuristics module classifies the client agent as a human, the client agent may be allowed to continue using the network resource. For instance, if the network resource is an e-commerce webpage, the client agent (e.g., a consumer using a web browser) may continue to browse the web site. On the other hand, if the heuristics module classifies the client agent as a web bot, information about the classification of the client agent is sent to a decision engine. The decision engine may determine an appropriate action to mitigate its impact. For example, the decision engine may be configured to execute a command to cause a bot countermeasure.

In the event that the heuristics module classifies the client agent as unknown, the network interaction data, also sometimes simply referred to as "network interactions," is next sent to a trained adversarial neural network. The trained adversarial neural network can be trained to classify the client agent as a human, a web bot, or as unknown. An adversarial neural network may be amenable to the classification of client agents because it can be trained using both labeled and unlabeled data (i.e., using semi-supervised training). The trained adversarial neural network can thus be trained using unlabeled data that is similar to the unlabeled data that the adversarial neural network will encounter during inference.

As with the heuristics module, if the trained adversarial neural network classifies the client agent as a human, the client agent may be allowed to continue using the network resource. If the trained adversarial neural network classifies the client agent as a web bot, information about the classification of the client agent is sent to a decision engine that may take appropriate actions as described above.

In the event that the trained adversarial neural network again classifies the client agent as unknown, the network interaction data is sent to a graph convolutional neural network. The graph convolutional neural network can be trained to classify the client agent as a human, a web bot, or as unknown using graph representations of the network interactions of the client agent.

Accordingly, the system generates a graph representation of the network interactions. The graph representation may be a representation of the connections and paths taken by a user or bot through a website during a session. A session may be, for example, a 30 minute window of time. In one example, a graph representation can be generated by associating each HTTP request with a graph node. Thus, nodes may correspond to, for example, loading a webpage, clicking on a link, submitting a form, or similar interactions. The nodes are then connected using edges between them to encode ordering or logical sequences of events.

As with the adversarial neural network, if the trained graph convolutional neural network classifies the client agent as a human, the client agent may be allowed to continue using the network resource. If the trained adversarial neural network classifies the client agent as a web bot, information about the classification of the client agent is sent to a decision engine. In the event that the trained graph convolutional neural network classifies the client agent as unknown, the network interaction data may be returned to the graph convolutional neural network for reevaluation as additional network interactions accumulate or until a predefined break condition is reached (e.g., a designated session time expires). Upon classifying a client agent as a web bot, the decision engine may determine an appropriate action to mitigate its impact.

Based on classification of the client agent as a web bot, the system generates a notification that may include information like the client agent's characteristics or behaviors. The notification may be sent to system administrators for remediation through an appropriate medium including email, push notification, system alerts, and so on.

The techniques disclosed herein for web bot detection via behavioral analysis and machine learning constitute improvements to the technical field of web bot detection and prevention. Traditional approaches to combating losses caused by web bots have floundered due to a technological arms race between the authors of bot scripts and website administrators. Web bots thus continue to generate unwanted network traffic and overburden server resources, which can result in considerable financial loss. Web bots are also responsible for fraudulent activities, such as click fraud, leading to distorted market dynamics and additional economic damages. The innovations of the present disclosure bring a new approach to bear on the problem that can reduce the impact of web bots.

The introduction of a tiered approach to web bot detection, whereby web bots may be detected using any of several technologies operating serially means that web bots that are optimized to escape notice by one detection technology are less likely to escape notice by others. The selection of configurable heuristics means that the winnowing of network traffic can be customized according to the particular context and that easily detectable web bots are removed from computationally intensive machine learning classification operations early on. Examples using an SGAN as the trained adversarial ML model may be particularly well configured for the web bot problem. The SGAN can enable the use of unlabeled data to train the SGAN classifier. Since it is usually impossible or impractical to label all data points of network interaction training datasets, the use of an SGAN may enable the modeling of a previously unexplored parameter space. Likewise, although the arms race nature of the bot problem means that bot operators can adapt their bots to escape some known detection measures, bot operators cannot disguise the purpose of their bots. The use of a graph convolutional neural network to classify network interactions based on a graph representation can be used to identify the purpose of a web client in order to determine whether a client is a bot or human on basis of that purpose.

Definitions

As used herein, the term "client agent" refers to program code that can send requests to a server via the HTTP protocol to access or modify resources. It encompasses a range of implementations including web browsers, mobile apps, or any other software capable of issuing HTTP requests and processing HTTP responses, thus enabling communication with web services. Client agents may also include scripts, bots, or automated processes that interact with servers via the HTTP protocol. Such automated client agents may include both benign bots such as search engine crawlers, and malicious bots programmed for nefarious activities such as web scraping, DDOS attacks, spamming, or data breaches.

As used herein, the term "network interaction" refers to any exchange of data or commands between a client agent and a server across a network. In some examples, the exchange may include HTTP requests and responses. However, the exchange of data may involve can also encompass other types of client-server communication protocols, such as WebSocket, file transport protocol (FTP), or HTTP push/pull, and so on.

As used herein, the term "characteristics" refers to identifiable properties or attributes of a client agent that can be determined by a server moderating a network interaction initiated by the client agent. For example, characteristics may include, HTTP methods, "User-Agent" header, IP address, request headers, payload size, cookies, and so on.

As used herein, the term "behaviors" refers to inferences about client agents made on the basis of characteristics or events that have been identified from information about client agent network interactions. For example, a client agent that arrives at a website, navigates and clicks about, and ultimately makes a purchase may be identified with a shopping behavior.

As used herein, the term "heuristics module" refers to program code for classifying network interactions according to a set of rules or assumptions. Such classifications may be made on the basis of client agent characteristics or behaviors. For example, the heuristics module may determine that a network interaction stems from a web bot based on factors such as frequency of requests, type of request, origin of request, or any irregularities in the request format. Irregularities may include unlikely client agent configurations or anomalous timestamps.

As used herein, the term "adversarial neural network" refers to a type of artificial neural network setup implemented in program code in which two neural networks, a generator and a discriminator, compete against each other in a zero-sum fashion. Some adversarial neural network implementations may be generative adversarial networks (GANs), which utilize the generator network to create data instances and the discriminator network to evaluate the authenticity of those instances, thereby improving the model's ability to learn and mimic complex data distributions. Another example implementation is a semi-supervised GAN (SGAN) that is a variant of a GAN. SGANs use both labeled and unlabeled data during training to improve predictive accuracy.

As used herein, the term "graph convolutional neural network" refers to a neural network variant that processes and learns from data structured as a graph. A convolutional neural network (CNN) traditionally refers to neural networks configured to process grid-structured data, such as images, and apply convolutional layers to scan across input features which are then pooled and connected in further layers. In a graph convolutional neural network, the techniques of CNNs are adapted to graph nodes and edges, which can enable the learning of node representations that capture both local and global graph topology. Some example graph convolutional neural networks may be deep graph convolutional neural networks (DGCNN). A DGCNN may include multiple layers of graph convolution operations.

As used herein, the term "bot countermeasure" refers to a technique for neutralizing or mitigating the activities of web bots. Example countermeasures may include a variety of techniques, such as IP blocking, CAPTCHA challenges, rate limiting, or alerting system administrators.

OVERVIEW

FIG. 1 is a diagram of an example system 100 for web bot detection using behavioral analysis and machine learning. System 100 illustrates a possible example implementation, but other implementations or embodiments are also possible. For instance, some embodiments may include variations on the functional groupings described below or be configured with some components on remote servers or cloud providers.

In general, during inference, the web bot detection subsystem 110 receives network interaction data generated by a client agent 115 interacting with a network resource. The network interaction data is serially processed by one or more of a heuristics module 125, a trained adversarial neural network 135, and a graph convolutional neural network 140. Each component, that may include one or more machine learning (ML) models, classifies the client agent 115 as a human, web bot, or unknown. When the client agent 115 is classified as a human or web bot, the web bot detection subsystem 110 can take actions to allow unimpeded access to network resources or to mitigate the impact, respectively. When the client agent 115 is classified as unknown, the network interaction data is sent to the next component (or reprocessed by a component) until a concrete classification is made or a pre-defined break condition is reached.

Web bot detection begins with the web bot detection subsystem 110 receiving network interaction data generated by a client agent 115. Client agent 115 may be any software or hardware device executing program code for executing network interactions on network resources exposed to web bots. For example, client agent 115 may include web browsers, mobile apps, application programming interfaces (APIs), or IoT devices. The client agent 115 can utilize HTTP or other network protocols to interact with web-based or other network resources.

Client agent 115 may be characterized by one or more characteristics like the "User-Agent" header, source IP address, browser configurations, and so on. Likewise, client agent 115 generates network interaction data during the course of accessing network resources. For example, network interaction data may include information such as the request and response headers, HTTP method used, uniform resource locators (URLs) accessed, timestamps, payload size, status codes, and potentially additional metadata related to the interaction.

The network interaction data generated by the client agent 115 is received by analytics module 120. Analytics module 120 receives raw client agent 115 network interaction data and prepares it for analysis through conversion to suitable formats for input to downstream components. For instance, analytics module 120 may receive client agent 115 logs or packet captures including HTTP request and response metadata. Such HTTP data may include client agent 115 characteristics such as the "User-Agent" header, IP address, request headers, and timing information. Client agent 115 characteristics and network interactions may be used to populate a suitable data structure for analysis by downstream ML components.

In some examples, raw network interaction data, like HTTP data, can be processed and categorized into discrete events. Each event can correspond to a user action in the web environment, such as initiating a GET request to retrieve a webpage, issuing a POST request to submit a form, or triggering a JavaScript event by clicking a hyperlink. Analytics module 120 may further collate or order the events to determine behaviors. For instance, a GET request for a homepage followed by another GET request targeting a product page could constitute a behavior signifying a user navigating from the homepage to a specific product page. In another example, a user may search for an item and then click on several results from the search, which may be indicative of a browsing behavior.

The preprocessed network interaction data is received by heuristics module 125. Heuristics module 125 may make a first classification of client agent 115 based on a set of pre-defined heuristics or rules. The heuristics may, for instance, be chosen to identify obfuscation measures indicative of bot activity or other characteristics. Failure of one or more heuristic tests may result in classification as a web bot. For example, a non-limiting list of heuristics implemented in some examples includes forged "User-Agent" headers, similarity of time between events, certain keywords in the "User-Agent" header, unrealistic client agent 115 window sizes, anomalous timestamps, suspicious IP addresses, and associated purchases. The heuristics of heuristics module 125 may be implemented as a set of heuristics-based filters, including if/then statements, case statements, or similar program code constructs. In the event that one or more of the heuristics cannot affirmatively classify the client agent 115 as a human or a web bot, the client agent 115 is classified as unknown. Conversely, if client agent 115 is affirmatively classified as a human or bot, the network interaction data and information about the classification is sent to the decision engine 150, discussed below.

Network interaction data for client agent 115 classified as unknown based on the heuristics-based filtering is then received by adversarial neural network 135. Adversarial neural network 135 includes program code for training neural network components through a competitive process whereby the components "compete" against each other. In a typical example, the generator attempts to produce unlabeled data instances that mimic real data, while the discriminator aims to accurately distinguish between the real data and the generated instances. During training, the discriminator and generator are updated through backpropagation based on the outcome of the discriminator's output.

In some examples, adversarial neural network 135 is a semi-supervised generative adversarial network (SGAN), which can be trained using both labeled and unlabeled data simultaneously. Training of the SGAN may include a generator, a discriminator, a classifier, and a shared neural network. The objective of the SGAN training may be to train the classifier to accurately classify the client agent 115 as a human or bot. In some examples, the discriminator and the classifier may share an underlying neural network. The use of the shared neural network can improve the performance of the classifier by leveraging knowledge from supervised and unsupervised samples through the discriminator.

During inference, the trained, shared neural network receives the network interaction data and classifies the client agent 115 as a human, bot, or as unknown. In the event that adversarial neural network 135 cannot affirmatively classify the client agent 115 as a human or a web bot, the client agent 115 is classified as unknown. Conversely, if client agent 115 is affirmatively classified as a human or bot, the network interaction data and information about the classification is sent to the decision engine 150, discussed below. In some examples, the client agent 115 is only affirmatively classified as a human or bot when a probability determined by the classifier component exceeds a certain threshold.

Network interaction data for client agent 115 classified as unknown is then received by graph convolutional neural network 140. In some examples, graph convolutional neural network 140 is a deep graph convolutional neural network (DGCNN). The DGCNN may be optimized for graphs with only node features (e.g., summary event data corresponding to each node), and no information encoded to or associated with the graph edges. Behavioral data determined by analytics module 120 is received by a graph generation 145 component for the construction of web traversal (WT) graphs processed by graph convolutional neural network 140.

A graph can be a data structure comprising nodes and edges that captures the events that occur during a session. A session may be, for example, a sliding 30-minute window of time encompassing all events for the 30 minutes preceding the most recent network interaction. Each network interaction event (e.g., a webpage request or form submission) may be mapped to a node and the graphs edges may correspond to the progression from one event to another in sequence. In some examples, the relationship between nodes, as defined by the edges, can correspond to a chronological progression between the events. In another example, events occurring on a single resource, like a specific webpage, may be summarized on a single node. For instance, if a particular web page is visited multiple times during a session, the event data at the corresponding node may reflect the number of times the web page was visited.

The DGCNN receives WT graphs following graph generation 145. The DGCNN can extract features through a graph convolution step applied to an input WT graph. The convolved WT graphs may be processed by a sort pooling layer to transform the convolved WT graphs into one-dimensional vectors. The one-dimensional vectors can be processed by a one-dimensional convolutional neural network (1D-CNN). The ID-CNN may receive the one-dimensional vectors and apply a convolution to the vectors one or more times. The convolved vectors may be passed through one or more dense layers that output a classification based on a probability that the client agent 115 is a web bot.

During inference, the trained graph convolutional neural network 140 receives the WT graph associated with the client agent 115 and classifies the client agent 115 as a human, bot, or as unknown. In the event that graph convolutional neural network 140 cannot affirmatively classify the client agent 115 as a human or a web bot, the client agent 115 is classified as unknown. Conversely, if client agent 115 is affirmatively classified as a human or bot, the network interaction data and information about the classification is sent to the decision engine 150, discussed below. If graph convolutional neural network 140 continues to classify the client agent 115 as the unknown class, then the WT graph corresponding to client agent 115 can be periodically reevaluated by graph convolutional neural network 140 as the network interactions of client agent 115 continue to develop and grow the WT graph. For example, the WT graph can be reevaluated every minute. In some examples, the web bot detection subsystem 110 may be configured with a break condition that halts reevaluation of client agent 115 after a period of time has elapsed or other predefined condition has occurred. For example, reevaluation of the dynamic WT graph may be halted after 30 minutes with no new events, corresponding to the length of the session that brackets the network interactions that constitute the WT graph.

The web bot detection subsystem 110 includes a decision engine 150. Upon classifying a client agent 115 as a web bot, the decision engine 150 may determine an appropriate action to mitigate its impact. For example, the decision engine 150 can determine an action based on the classification(s) made by heuristics module 125, adversarial neural network 135, or graph convolutional neural network 140. For example, the decision engine 150 may be configured to execute a command to cause a bot countermeasure 155. Bot countermeasure 155 may include restricting a network access of the client agent, presenting a verification challenge to the client agent, logging the one or more behaviors of the client agent, modifying a property of a network, associating a rate limit with the client agent, throttling a network response the one or more behaviors of the client agent, blocking an IP address of the client agent, among many other possible bot countermeasure(s) 155. The determined action can be sent to, for example, a network firewall or the affected web service to implement one or more possible bot countermeasure(s) 155.

In some examples, the decision engine 150 may base the determination of the action on additional contextual information or configuration. For example, the decision engine 150 may be configured to throttle (e.g., rate limit) a benign web bot's request. Likewise, the IP address of a more threatening web bot maybe blocked.

The decision engine 150 may include components for determining whether a client agent 115 classified as a web bot is benign or malicious. For example, decision engine 150 may classify web bots as benign or malicious based on client agent 115 characteristics or behaviors like request frequency, interaction patterns, and IP reputation. The characteristics can be further correlated with known patterns of malicious activity.

In some examples, the decision engine 150 may execute a command to cause generation of real-time alerts or notifications for system administrators or support personnel by a notifications and alerts 160 component. For example, a generated notification may include information about one or more characteristics of the client agent 115 and one or more behaviors of the client agent 115. For instance, a generated notification could include specific details such as the detected behavior, the source IP address of the web bot, the targeted resources, and the time of the incident. Notifications and alerts 160 may generation notifications in any suitable format including email, text messages, push notifications, in-app notifications, and so on.

SGAN Training and Inference

Figure 2A:
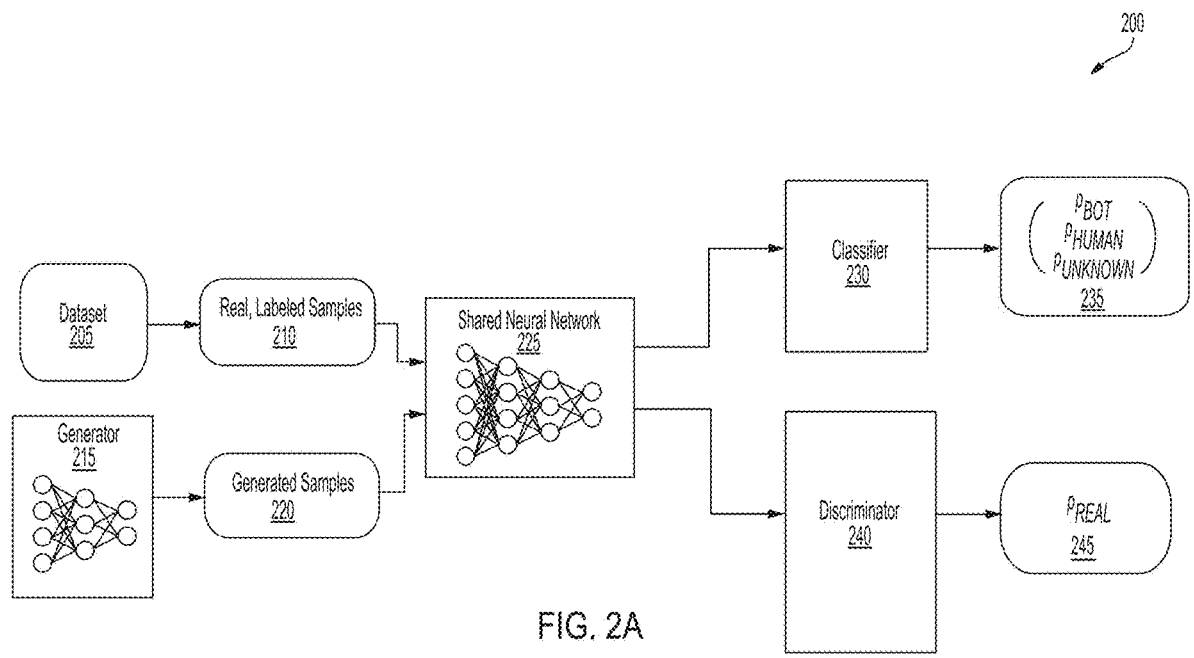
FIGS. 2A-B are diagrams of an example implementation a semi-supervised generative adversarial network (SGAN) for web bot detection using behavioral analysis and machine learning, according to some embodiments of the present disclosure.
Figure 2B:
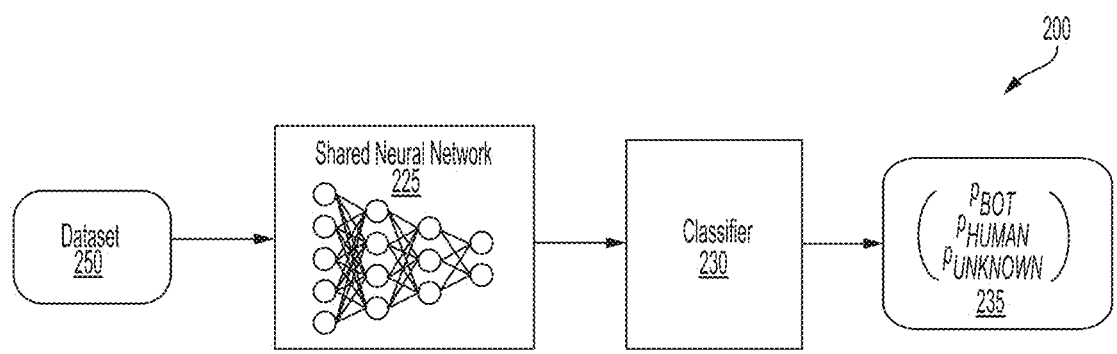

FIGS. 2A-B are diagrams of an example implementation a semi-supervised generative adversarial network (SGAN) 200 for web bot detection using behavioral analysis and machine learning. SGAN 200 may include various hardware and software components. Components may be hosted on dedicated servers, cloud-based infrastructure, or a combination of both. SGAN 200 may include components for operating in both training and inference modes. For example, the SGAN 200 may include memory devices, computational resources for model training and inference, and network interfaces for receiving and sending data. The components of SGAN 200 may communicate over a network which could be any combination of local area networks (LANs), wide area networks (WANs), or the internet.

In an SGAN used in a system for web bot detection using behavioral analysis and machine learning, events are analyzed for bot signals by a trained machine learning (ML) model, more specifically, an SGAN trained on partially labeled data. SGAN 200 includes a generator 215, a classifier 230, and a discriminator 240. The classifier 230 and the discriminator 240 may use a shared neural network 225. An SGAN may be used for classifying events based on network interactions that are both labeled and unlabeled. In some implementations, the SGAN may include a generator 215 and a discriminator 240, in which each of the generator 215 and the discriminator 240 include at least one feed forward neural network. In this implementation, the discriminator 240 includes the classifier 230 and the discriminator 240 and the classifier 230 both use a shared neural network 225.

FIG. 2A depicts an example SGAN 200 during training. The classifier 230 can be trained using labeled data points. In contrast, both unlabeled and labeled data points can be used to train the generator 215 and the discriminator 240. In some examples, the training data can be labeled by applying ground truth assumptions about bots and humans using client agents, in addition to the rules used in heuristics module 125 reflecting signals for bot activity. For example, the ground truth assumptions used to label training data may be used to label data as from a web bot if its IP address is found among those listed in a list of IP addresses of public cloud providers. Cloud providers may be used to host web bots or scrapers. Accordingly, an IP address originating from these known ranges may an indicator that the associated traffic could be from a bot rather than a human. In contrast, training data may be labeled as human if its IP address is not found among those listed in a list of IP addresses of public cloud providers and it can be linked to an event or behavior which can only be triggered by human users of the associated network resource (e.g., making a purchase on an e-commerce website). Labeled data may be further preprocessed to obtain a data representation suitable for use in training and inferring by ML models.

The thus-labeled training data can be used to train the classifier 230. In some examples, the classifier 230 is a subcomponent of the discriminator 240 and the two components may share a neural network 225. The goal of the generator 215 is to generate realistic labeled data points, the goal of the discriminator 240 is to detect the fake data points. All generated data points that are not detected as generated are likewise used to train the classifier 230. This makes it possible to use features of the unlabeled data to train the classifier 230. For this reason, the SGAN 200 model is particularly applicable to the web bot problem since it may be difficult or impractical to label all data points of web log datasets. Once the model has reached an appropriate performance, the model can then be used for inference on unknown data points.

Generally, training SGAN 200 involves training the generator 215 to generate fake samples (e.g., synthetic client agent 115 event or multiple such events) that the discriminator 240 cannot distinguish from real samples. SGAN 200 includes classifier 230 since ultimately, a classification of client agent 115 is the desired output of web bot detection subsystem 110. Therefore, in some examples, the discriminator 240 includes both a discriminator 240 component and a classifier 230 component. Discriminator 240 can generate a probability 245 $p_{real} \in [0, 1]$ that describes the probability 245 of a given client agent 115 network interaction being real. If $p_{real}$ is close to one (i.e., 100%), the sample was likely real (i.e., not generated by generator 215). In contrast, if $p_{real}$ is close to 0, the sample was likely generated by generator 215.

Classifier 230 can determine the class membership of a given sample. Classifier 230 may, for example, output a vector of class membership probabilities 235 $[p_1, \ldots, p_n]$ for a given sample. In some examples, n may be 3, corresponding to 3 possible classes 235 like human, bot, or unknown.

In some examples, classifier 230 may use the Softmax activation function. The Softmax activation function can transform input into a probabilistic distribution by exponentiating each of the neural network outputs and then normalizing them to ensuring that the output values are all positive and sum to 1.

Discriminator 240 and classifier 230 may use a shared neural network 225 (e.g., shared neural network weights). Use of shared neural network 225 may improve the performance of the classifier 230 by leveraging the training of the discriminator 240 that uses both supervised and unsupervised samples. Such an approach can improve accuracy of classifier 230 in training contexts in which labeled data is scarce.

In some examples, training of SGAN 200 is performed in four phases. First, the classifier 230 is first trained on a labeled subset of the training data. Then, the discriminator 240 is trained on real samples. Next, the generator 215 generates fake samples to train the discriminator 240. Finally, the generator 215 and the discriminator 240 are trained in parallel using fake samples generated by the generator 215.

During training, the classifier is 230 is trained on real, supervised samples. For example, the classifier 230 may be trained to output a vector of class membership probabilities for individual samples. Training of the classifier 230 may be performed by minimizing a cross entropy loss function. The cross entropy loss function may be given by:

$$L(Y_k, p_k) = (-1) \cdot \sum_{k=1}^{n} Y_k \cdot \log(p_k) \qquad (1)$$

in which the loss L for the classifier 230 is denoted by $L_C$, n denotes the number of classes, k denotes the kth class, $Y_k$ denotes the truth value for the class k, and $p_k$ denotes the probability of membership in class k that is output from the Softmax-activated output layer of classifier 230. The truth value $Y_k$ is 1 if the sample belongs to class k and 0 if it does not. In some examples, the classifier 230 may use a sparse categorical cross entropy loss function. The sparse categorical cross entropy loss function may be used for multiclass classification scenarios in which the classes are mutually exclusive. For instance, classifier 230 may be configured to require a classification of a sample as a member of exactly 1 of the 3 classes human, bot, or unknown.

Class membership probabilities can be computed by classifier 230 by applying the Softmax activation function to the output layer of shared neural network 225. The Softmax activation function can transform input into a probabilistic distribution by exponentiating each of the neural network outputs and then normalizing them to ensuring that the output values are all positive and sum to 1. For example, the Softmax function for calculating the probability that a sample is in class k may be given by:

$$S(Z, z_i) = \frac{e^z_i}{\sum_{z_k \in Z} e^{z_k}} \qquad (2)$$

where Z denotes the vector of all possible output activations and $z_i$ denotes the activation layer of neuron i of the output layer of shared neural network 225. The Softmax function can be used to compute the normalized probabilities for real valued inputs, which is the neuron activation in the case of shared neural network 225. The resulting vector may be a categorical probability distribution containing class membership probabilities. During training of the classifier 230, the loss value can reflect the number of falsely predicted classes and may thus be used to optimize the weights of the shared neural network 225 using the backpropagation algorithm.

The discriminator 240 may be trained using both real and generated samples to improve the accuracy of the discrimination operation between real and fake samples. The loss value may be denoted $L_D$. The discriminator 240 loss can be computed based on the output of the discriminator 240 and backpropagated through either the discriminator 240 alone or both the discriminator 240 and generator 215 networks. Since the generator 215 creates labeled, realistic data points, the performance of the classifier 230 can be significantly improved due to the increased amount of labeled data. Discriminator 240 may use a binary cross entropy loss for the binary classification of distinguishing between two possible outcomes, like fake or not fake.

Activation of the output layer of the shared neural network 225 for use by the discriminator 240 may be performed using the ExpSum activation function. ExpSum activation can be used to increase activation for real data points and reduce activation for fake data points. The ExpSum activation function may be given by:

$$E(Z) = \frac{F(Z)}{F(Z)+1} \qquad (3)$$

where $F(z) = \Sigma_{z_k \in z} e^{z_k}$ and Z denotes the k activations of the output layer of the shared neural network 225. In some examples, a LogExpSum activation function may be used. For example, LogExpSum may be given by:

$$LES(z) = \log \sum_{i=1}^{n} e^{z_i} \qquad (4)$$

where LES is the LogExpSum activation value for the ith neuron of the output layer of shared neural network 225 and n is the number of neurons in the output layer.

FIG. 2B depicts an example SGAN 200 during inference. The shared neural network 225 trained during the training process discussed above is used to classify network interaction data 250 from client agent 115. Classifier 230 receives the output of the final later of shared neural network 225 and applies the Softmax activation to determine a probability of the client agent 115 event belonging to one of the possible classes 235. For example, the possible classes may be human, bot, or unknown. Classification may be performed according to certain predefined rules. For instance, an event may be classified as a member of a particular class if the associated probability of class membership for that class exceeds a predefined threshold value. Rules can be similarly defined for ties and other possible outcome permutations.

DGCNN Training and Inference

The graph convolutional neural network 140 can be used to classify client agent 115 as a human, bot, or unknown, based on an analysis of a graph representation of the behavior of client agent 115 during a session. In some examples, the graph convolutional neural network 140 may be a deep graph convolutional neural network (DGCNN) including a graph classifier that classifies the client agent 115 on the basis of its associated web traversal (WT) graph. Some WT graph implementations include only nodes (i.e., no information is encoded by the edges connecting the nodes). A DGCNN can be suitable for analysis of graph representations with only node features and no information encoded on the edges (e.g., no edge weights or directionality).

Figure 3:
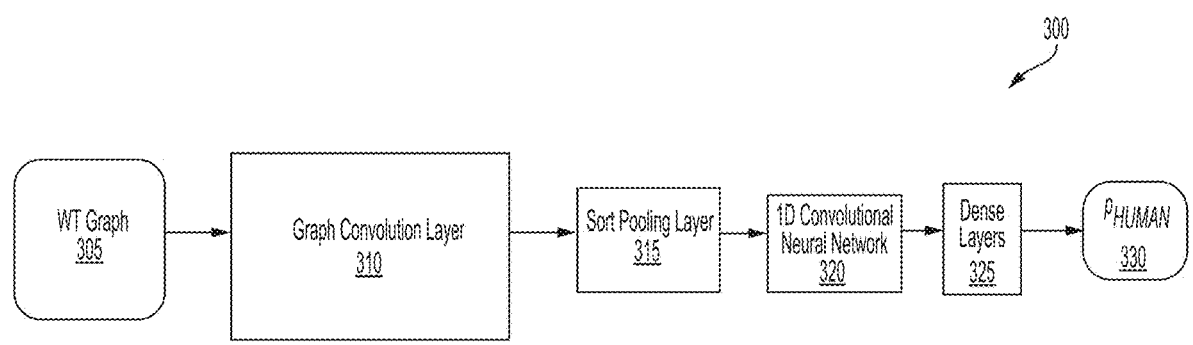
FIG. 3 is a diagram of an example implementation a deep graph convolutional neural network (DGCNN) for web bot detection using behavioral analysis and machine learning, according to some embodiments of the present disclosure.

FIG. 3 is a diagram of an example implementation a DGCNN 300 for web bot detection using behavioral analysis and machine learning during inference. Inference begins with example DGCNN 300 receiving a WT graph 305. In some examples, WT graph 305 may be generated by a graph generation 145 component. DGCNN 300 includes a graph convolution layer 310 that can be used to extract the node features from the input WT graph 305. The convolved WT graphs are received by a sort pooling layer 315 that can transform the convolved WT graphs into one-dimensional (1D) vectors. The 1D vectors are processed by a 1D convolutional neural network (1D-CNN) 320. The ID-CNN 320 receives the ID vectors and applies a convolution. In some examples, the convolution of the ID vectors by ID-CNN 320 may be performed two or more times. After the graph convolution follows one or more dense layers 325 that can lead to a classification output. The dense layers 32 may include one or more fully connected neural network layers. The DGCNN 300 can thus convert WT graph 305 into a probability that the client agent 115 is a bot (or human).

Figure 4A:
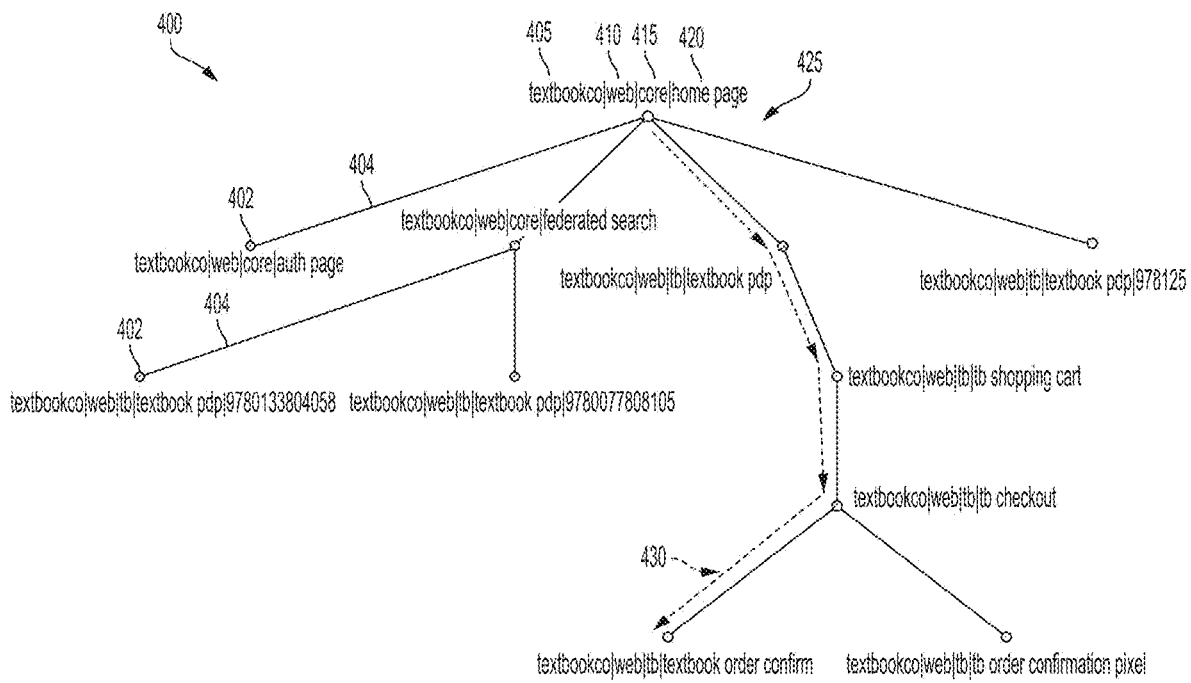
FIGS. 4A-B are illustrations of web traversal (WT) graphs that may used during training or during inference of a DGCNN for web bot detection using behavioral analysis and machine learning, according to some embodiments of the present disclosure.
Figure 4B:
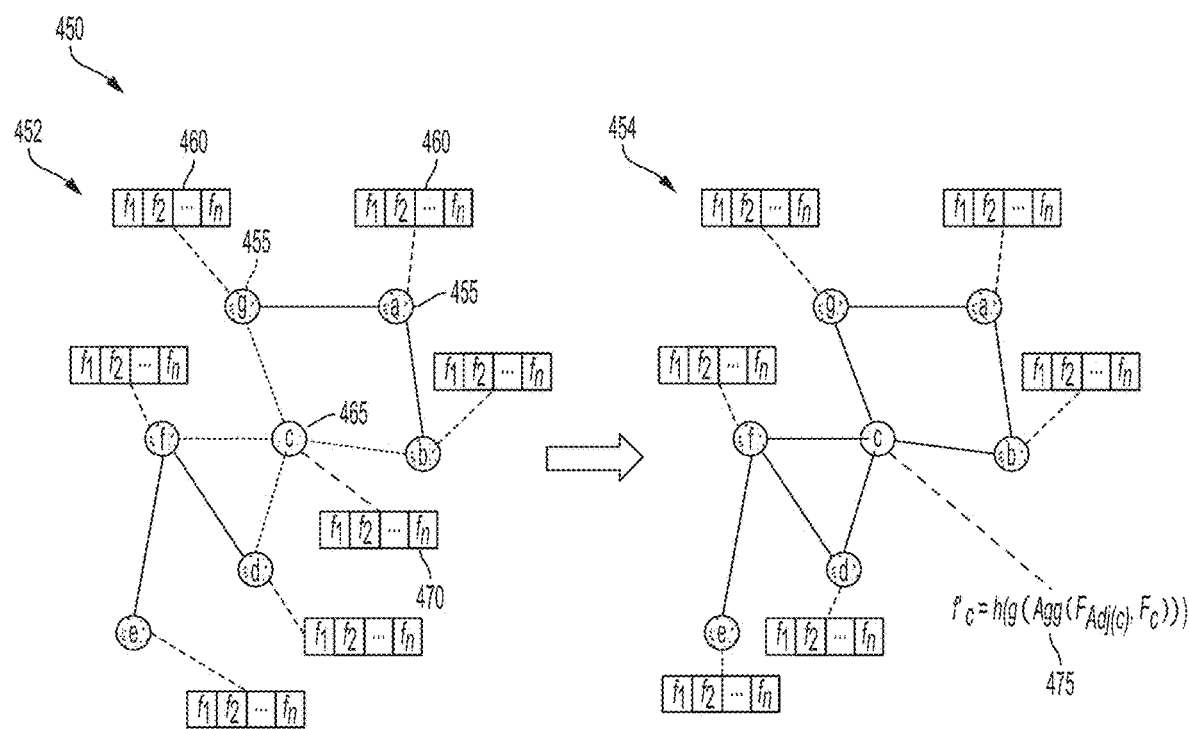

FIGS. 4A-B are illustrations of web traversal (WT) graphs that may used during training or during inference of a DGCNN for web bot detection using behavioral analysis and machine learning. FIG. 4A shows an illustration of a WT graph 400 schematically represented after output by, for example, analytics module 120. WT graph 400 shows a representation of a client agent 115 navigating among several pages of a particular website 405. Each node 402 includes network interaction data 250 generated by a client agent 115 corresponding to a particular page 420 of website 405. For example, nodes 402 may correspond to, loading a webpage, clicking on a link, submitting a form, or similar interactions. In some examples, the nodes 402 may include summary data relating to webpage 420. For example, the nodes may include information that reflect network interactions by client agent 115 while navigating to web page 420 multiple times. The nodes 402 are connected using edges 404 between them to encode ordering or logical sequences of events. For example, the edges may reflect logical connections between webpages, like the ability to link from one page to another page. In some examples, the edge 404 do not encode any additional information about client agent 115. (Nodes 402 and edges 404 are labeled with dotted lines to show contrast between lead lines associated with reference characters 402, 404 and the graph edges.)

Nodes 402 may include labels 425. The labels 425 may be identifiers for visualization of WT graph 400. In some examples, labels 425 may include information that can be used by the DGCNN 300 for classification of the client agent 115. A label 425 may include a reference to the website 405. For example, the website 405 may include any number of web pages. Websites may be further divided, logically or administratively, into sections 410 and subsections 415. In some examples, sections 410 or subsections 415 may be names based on a portion of the uniform resource locator (URL). Each webpage 420 may be identified by a name that corresponds to the resource name of the page 420 in the corresponding URL. For example, a webpage that is a constituent of the website mycompany.com may be identified with example URL https://mycompany.com/web/core/home_page.html. In some examples, the website 405 is mycompany.com, the section 410 is web, the subsection 415 is core, and the page is home_page.html. However, the elements of labels 425 may be configurable by an administrator of the analytics module 120 or the graph generation 145 component, such that their identities may not be evident from the URL. WT graph 400 depicts an example sequence 430 of network interactions performed by a client agent 115. For example, client agent 115 may arrive at the homepage, navigate to a textbook page, add a textbook to a shopping cart, checkout, and then confirm the order. However, WT graph 400 may not encode chronological sequence information. Client agent 115 may, for example, visit pages multiple times using the web browser back button or similar method for visiting pages out of order. Thus, sequence 430 is just one illustrative possible sequence shown by way of example.

FIG. 4B depicts a graphical illustration of graph convolution 450 as performed by graph convolution layer 310. FIG. 4B depicts a WT graph 452 with 7 nodes 455, in which each node has a vector 460 $F=(f_1, f_2, \ldots, f_n)$ attached. The attached vectors 460 correspond to the summary or aggregate network interaction data 250 generated by a client agent 115 at the network resource corresponding to the node 455. For example, as described above, each node 455 may correspond to a webpage and the attached feature vector 460 may correspond to various events that occurred there, such as total mouse clicks of a certain button.

The feature vectors 460 may be preprocessed such that each element of the feature vectors 460 are real and greater than or equal to 0, which can make them suitable for processing by neural networks. During graph convolution 450 as performed by graph convolution layer 310, a particular node 465 v (e.g., node c in FIG. 4B) is selected according to a suitable selection procedure. For example, selection of the nodes 455 may be done in random order. The set of nodes adjacent to node 465 Adj(v) is determined. The feature vectors 460 of the set of nodes adjacent to node 465 are aggregated with the feature vector 470 of node 465. The aggregation operation may be performed using any suitable operation such as summing, averaging, or max pooling. The aggregated feature vector can be used as input to a non-linear function g. Non-linear function g can be any suitable non-linear function including, for example, a feed-forward network. The output of non-linear function g can be activated using an arbitrary activation function h including, for example, the hyperbolic tangent operation tan h. The output of the activation function h may replace the existing feature vector 470 of node 465. These operations 475 can be repeated for all nodes 455 and feature vectors 460 of the WT graph 452, yielding a convolved WT graph 452 with the same topology as the original graph, but with the relevant features extracted and reinforced by the graph convolution 450. The operations 475 show the convolved feature vector $f'_c$ for node 465.

In some examples, the graph convolution 450 operation can be performed using matrix operations. For example, all feature vectors may be merged into an information matrix X. Information matrix X can be transformed using filter matrix W by computing Y=X·W. Adjacency matrix A can be multiplied with matrix Y to propagate node information to neighboring nodes and the selected node. A Y can be normalized using the inverse diagonal degree matrix $D^{-1}$ of WT graph 452. The normalized matrix can then be activated using an activation function f. In some examples, these steps, summarized compactly as $Z=f(D^{-1}AY)$ may be equivalent to the operations 475 discussed above.

Performing the convolution using these matrix operations can be used to determine a "color" of the nodes 455 of convolved WT graph 454 based on the Weisfeiler-Lehman (WL) subtree kernel for 1-hop feature propagation. The WL subtree kernel can be used to capture the local neighborhood information of nodes in a graph. In this convolution method, nodes may be iteratively updated as described above. In addition to the aggregation and convolution of feature vectors 460, the feature vectors 460 can be associated with a color using a suitable mapping procedure. In each convolution iteration, the node 455 color can be determined by the sorted set of features or colors of its neighbors, which can then be hashed to provide a unique new color. Thus, each node 455 can be assigned a color $c_t$ where $t=1, \ldots, n$ and $n \in \mathbb{N}$.

The sort pooling layer 315 can use the mapped color information to sort the feature descriptions. For example, the colors may represent structural roles of nodes 455 within the convolved WT graph 454. Sort pooling layer 315 receives a tensor of n rows in which each row is one of the feature vectors 460 from convolved WT graph 454. Sort pooling layer 315 sorts nodes 455 making up the received tensor according to the color index assigned as described above. The sort pooling layer 315 outputs a tensor of k rows in which again each row contains a feature vector 460. The sort pooling layer 315 can then unify the input dimension by either padding the input by k−n rows if n<k or deleting one or more rows by n−k rows if n>k. The number of rows in the output tensor (k) may thus differ from the number of rows in the input tensor (n). In some examples, k is a natural number that is selected based on empirical observations of the performance and accuracy of the graph convolution 450 operation.

Figure 5:
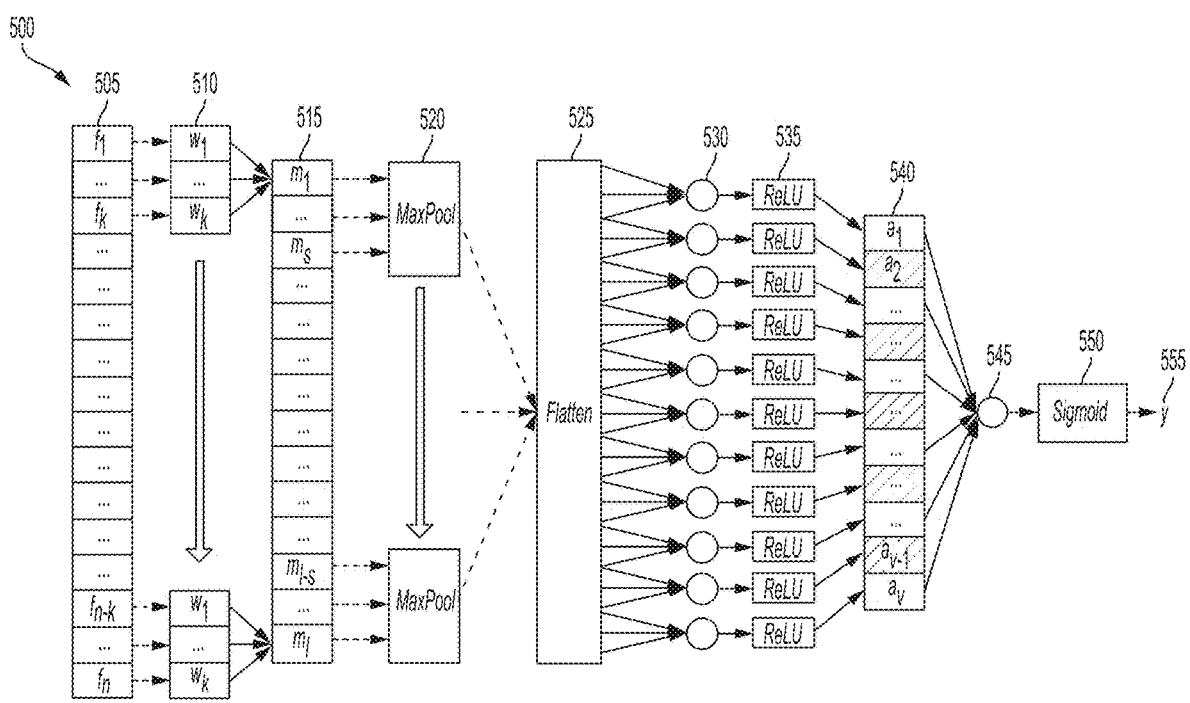
FIG. 5 shows an illustration of an example implementation of a one-dimensional convolutional neural network (1D-CNN) for web bot detection using behavioral analysis and machine learning, according to some embodiments of the present disclosure.

FIG. 5 shows an illustration of an example implementation of 1D-CNN 500. The sorted tensor is received by 1D-CNN 320. In a first operation 505, 1D-CNN 320 concatenates the sorted tensor row-wise. The resulting row-wise concatenated vector is denoted as $F=(f_1, f_2, \ldots, f_n)$ with $n \in \mathbb{N}$. In operation 510, a filter kernel $W=(w_1, w_2, \ldots, w_k)$ is applied to the output of operation 505, with $k \in \mathbb{N}$ and k<n. The filter kernel W may be applied by the computation of the dot product of W and the first k elements of F. Still in operation 510, the filter W is moved by a stride value $q \in \mathbb{N}$ such that $w_1$ will now be applied to $f_c \in F$ with 1<c≤n. The application of the filter kernel W is repeated now, except now on elements $f_{1+q}, \ldots, f_{k+q}$. This procedure is repeated until $w_k$ coincides with $f_n$. The output of operation 510 is the feature map 515 $M=(m_1, m_2, \ldots, m_l)$ with $l \in \mathbb{N}$.

At operation 520, a max pooling layer is applied to feature map M that selects s=|S| subsequent elements from M, determines the maximum element max(S), and propagates it to the next layer. S may be defined as the sliding window of the max pooling layer. For example, if |S|=4, then 4 neighboring elements of feature map 515 can be pooled together and the maximum value of those 4 elements is used as input for operation 525. The max pooling operation 520 can be applied to prevent overfitting and to add translation invariance. In some examples, operations 510 and 520 may be applied one or more times, based on the number of different filter kernels W in use. The output of max pooling operation 520 is a multi-dimensional array. Operation 525 flattens or converts the multi-dimensional array into a one-dimensional array. For example, the multi-dimensional array can be flattened by concatenating all of its rows or columns.

At operation 530, each element of the flattened array is assigned to a neuron. Each element can be multiplied by the weight of its connection to the assigned neuron. Further, the products related each neuron are summed. At operation 535, the sums for each neuron are activated using the Rectified Linear Unit (ReLU) activation function, given by ReLU(x)=max (0, x). The ReLU activation function is a non-linear function that outputs the input directly if it is positive, otherwise, it outputs zero.

At operation 540, a dropout operation is applied that removes a portion of the nodes from further computations. In some examples, the dropout operation may involve a pre-defined dropout rate and a corresponding dropout operation. For instance, a dropout rate of 50% may be defined to include randomly dropping 50% of the nodes. At operation 545, the neurons that are output from operation 540 are input to a single neuron. In some examples, operation 545 is performed by computing the weighted sum of all un-dropped neuron activations connected to the single neuron. At operation 550, the sigmoid activation function is applied to the single neuron to yield a classification 555 of the input WT graph 542. The sigmoid activation function is a non-linear function that maps any input value into a range between 0 and 1 that can be used to obtain a probability needed for classification.

Figure 6:
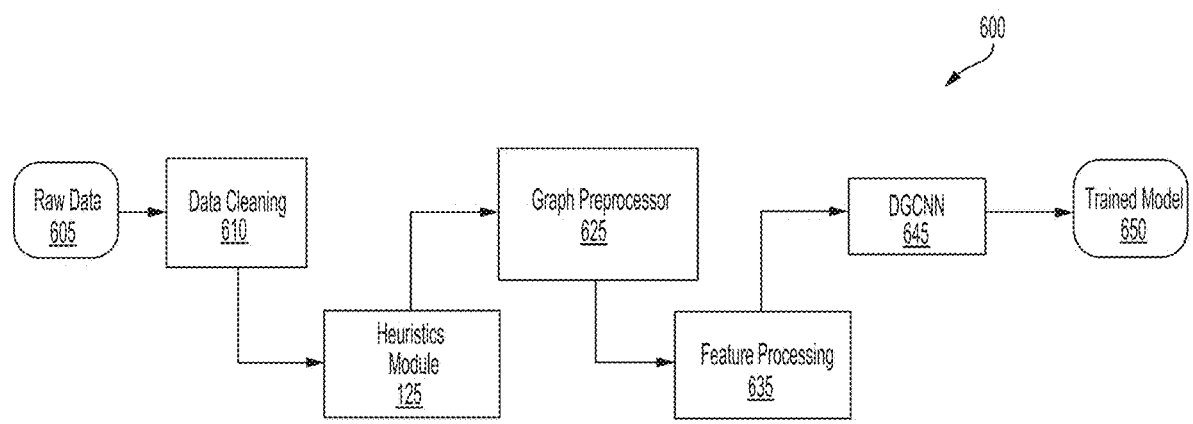
FIG. 6 depicts an example system for training for training a DGCNN for web bot detection using behavioral analysis and machine learning, according to some embodiments of the present disclosure.

FIG. 6 depicts an example system 600 for training for training a DGCNN for web bot detection using behavioral analysis and machine learning. System 600 may include various hardware and software components. Components may be hosted on dedicated servers, cloud-based infrastructure, or a combination of both. The system 600 may include components for operating in both training and inference modes. For example, the system 600 may include memory devices, computational resources for model training and inference, and network interfaces for receiving and sending data. The components of system 600 may communicate over a network which could be any combination of local area networks (LANs), wide area networks (WANs), or the internet.

System 600 includes a data cleaning 610 component that receives raw data 605 including data reflecting network interactions by client agent 115. The data cleaning 610 component may preprocess the network interactions constituting raw data 605, which can involve eliminating irrelevant entries, handling missing values, and standardizing data formats. Data cleaning 610 may thus ensure that the data is in a suitable state for further analysis by downstream components in the system. In some examples, the data cleaning 610 component is the analytics module 120 described in FIG. 1 and the accompanying description.

For instance, data cleaning 610 component may receive client agent 115 logs or packet captures including HTTP request and response metadata. Such HTTP data may include client agent 115 characteristics such as the "User-Agent" header, IP address, request headers, and timing information. Client agent 115 characteristics may be used to populate a suitable data structure for analysis by downstream ML components. For example, a JavaScript Object Notation (JSON) object may be instantiated and populated with preprocessed data.

The preprocessed data is received by heuristics module 125. Heuristics module 125 may be used to label network interaction data 250 using ground truth assumptions and other heuristics. For example, the ground truth assumptions used to label training data may be used to label data as from a web bot if its IP address is found among those listed in a list of IP addresses of public cloud providers. In contrast, training data may be labeled as human if its IP address is not found among those listed in a list of IP addresses of public cloud providers and it can be linked to an event which can only be triggered by human users of the associated network resource (e.g., making a purchase on an e-commerce website). Other heuristics may be used to label training data such as forged "User-Agent" headers, similarity of time between events, certain keywords in the "User-Agent" header, unrealistic client agent 115 window sizes, anomalous timestamps, suspicious IP addresses, and associated purchases, among others.

The labeled training data is received by graph preprocessor 625. Graph preprocessor 625 can generate WT graphs based on the labeled training data. In some examples, graph preprocessor may be similar to graph generation 145 component as discussed in FIG. 1 and the accompanying description. For example, the graph preprocessor 625 may represent each network interaction event with a given webpage as a node within a WT graph. Each node within the WT graph may include aggregated network interactions that include sums and counts for each time the client agent 115 interacts with the web page. Likewise, edges between nodes can then established based on the similarities or relationships between network interaction data. For instance, the edges may represent navigable paths between web pages or sequential ordering of web pages corresponding to certain functionalities of the web site. However, while the edges may show some logical relationship between nodes, they do not encode any additional information.

The WT graphs are received by a feature processing 635 component. Feature processing 635 component may encode the node features associated with each node upon generation of the WT graph. For example, various transformation functions or encoding schemes may be applied to the node features, which might include various attributes of network interaction data such as frequency, duration, or sequence, thereby creating a more suitable input for the convolutional operations of the DGCNN 645. In one implementation, the feature processing 635 component converts all known features about a node for each node in a WT graph and converts them into a binary vector (e.g., a vector containing only two possible elements).

The labeled, encoded graphs are received by DGCNN 645. The DGCNN 645 is trained by passing the labeled, encoded graphs through the components of the DGCNN 645. For example, the DGCNN 645 may include components similar to those described with respect to FIGS. 3 and 5. The DGCNN 645 may output a probability that a given labeled, encoded WT graph is a bot or human. The errors between the output probability and actual classification are calculated using a suitable loss function, and the network weights are updated by backpropagating this error through the network using gradient descent or a similar optimization algorithm. In some examples, a binary cross entropy loss function can be used to predict a single value in the interval between 0 and 1, inclusive.

The system 600 outputs the trained DGCNN 650 once a suitable level of accuracy has been attained. The trained DGCNN 650 can then be used during inference for web bot detection. For example, the trained DGCNN 650 may be the trained graph convolutional neural network 140 of FIG. 1 and the accompanying description. The trained DGCNN 650 may be configured to classify the client agent 115 as a human, bot, or as unknown until a human or bot classification is made or a break condition is reached.

Method for Web Bot Detection

Figure 7:
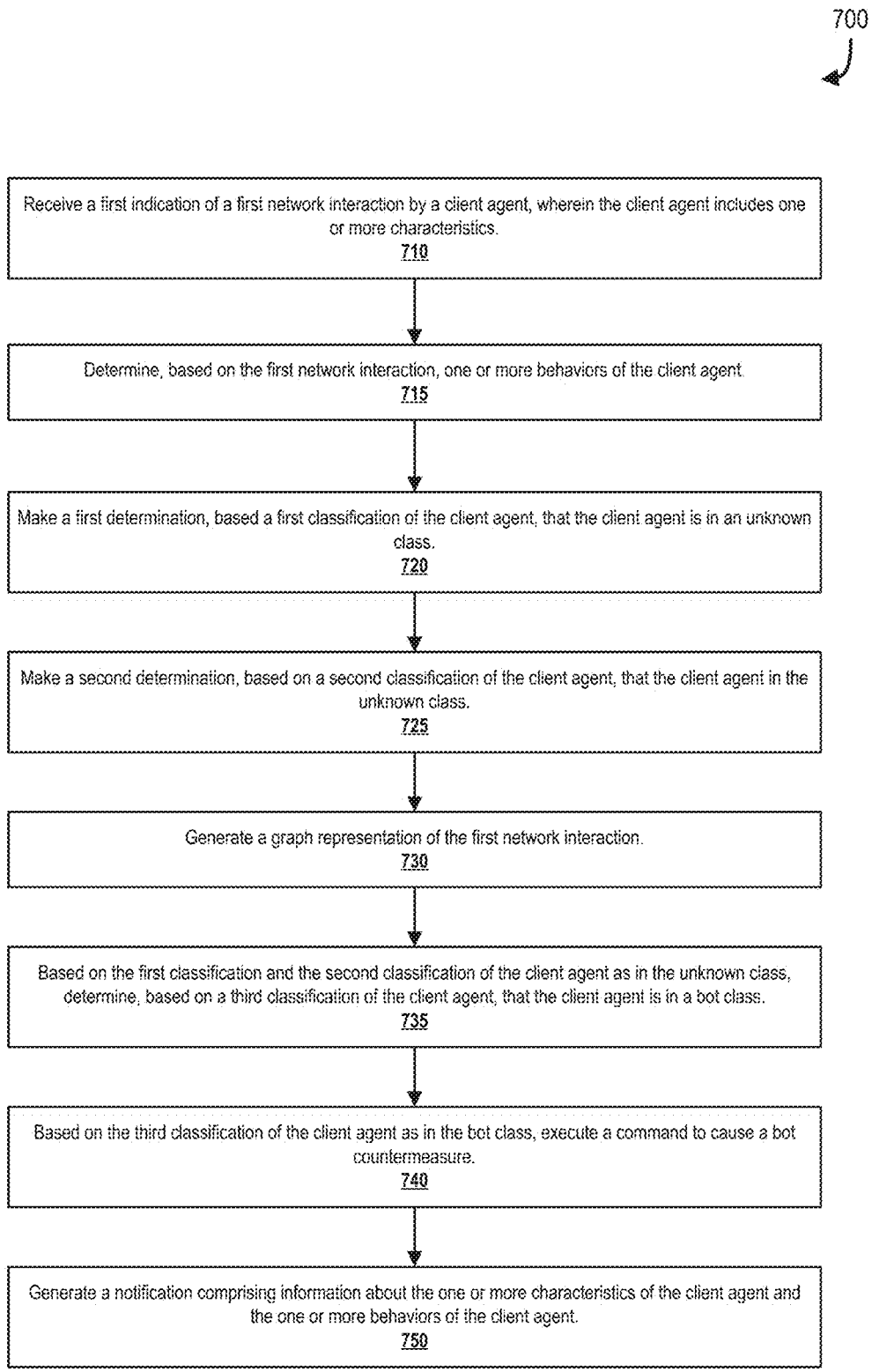
FIG. 7 is a flow diagram of an example of a process for web bot detection using behavioral analysis and machine learning, according to some embodiments of the present disclosure.

FIG. 7 is a flow diagram of an example of a process 700 for web bot detection using behavioral analysis and machine learning. The process 700 depicted in FIG. 7 may be implemented in software executed by one or more processing units of a processing device, implemented in hardware, or implemented as a combination of software and hardware. This process 700 is intended to be illustrative and non-limiting. The example process herein is described with reference to the example web bot detection subsystem 110 depicted in FIG. 1, but other implementations are possible. Although FIG. 7 depicts various processing operations occurring in a particular order, the particular order depicted is not required. In certain alternative embodiments, the processing may be performed in a different order, some operations may be performed in parallel, or operations may be added, removed, or combined together.

At block 710, the processing device receives a first indication of a first network interaction by a client agent 115, where the client agent 115 includes one or more characteristics. For example, the processing device may include a web bot detection subsystem 110 with various components for web bot detection using behavioral analysis and machine learning. The first indication of a first network interaction may be, for example, received network or application logs, captured packets, a link to a data repository containing such information, and so on. In some examples, the first indication is received by the analytics module 120.

The first network interaction may be reflective of any action taken by client agent 115 with respect to a particular network resource. For example, the network interaction may include an HTTP request to load a web page, downloading additional files associated with the page (e.g., JavaScript, assets, etc.), submitting a form, initiating a login process, uploading a file, executing JavaScript code, clicking on a link to navigate to another page, interacting with a web application's API, and streaming video or audio content, among many other possibilities. In some examples, the network interaction data 250 may include information about specific actions performed on the webpage (such as clicks, form submissions, or mouse movements). Such information can be gathered using, for example, various commercial JavaScript frameworks.

The one or more characteristics of the client agent 115, may include the "User-Agent" header which provides information about the browser and operating system, the IP address from which the request was made, the HTTP method used (GET, POST, etc.), the headers sent in the request, the response time of the client agent 115 to server communications, cookies stored on the client agent 115, the presence of any add-ons or plugins.

At block 715, the processing device determines, based on the first network interaction, one or more behaviors of the client agent 115. For example, the system may include an analytics module 120. The analytics module 120 can receive the information about the first network interaction. The information about the first network interaction may include logs or packet data such as such as HTTP methods used, "User-Agent" header details, time of request, source IP address, response codes, and cookie details, among others.

The analytics module 120 can sort and classify the network interaction data 250 into behaviors such as loading a webpage, clicking a hyperlink, submitting a form, triggering asynchronous Javascript and XML (AJAX) calls, initiating media streams, and more. The downstream modules may use the client agent 115 characteristics and behaviors in sequence to classify the client agent 115 (e.g., whether human or bot). For example, if a user visits a homepage, lingers for a while, then proceeds to click on a product link, these two events, along with the time spent on the homepage, may constitute a human a behavior. In contrast, a series of rapid, high-volume form submissions might be indicative of a bot-like behavior. The downstream detection and classification modules can be configured to detect these characteristics and behaviors. Used in concert, the downstream detection and classification modules can provide significant accuracy in the detection of web bots.

At block 720, the processing device makes a first determination, based a first classification of the client agent, that the client agent 115 is in an unknown class, where the first classification is based on the one or more characteristics of the client agent 115 and the one or more behaviors of the client agent. If the classification of the event is as unknown, the classification process may continue with the next component. For example, the first determination may be made by a heuristics module 125. Heuristics module 125 may process preprocessed network interaction data 250, employing a predetermined rule set for an initial classification of client agent 115. These rules, or heuristics, target identifying suspicious characteristics and obfuscation measures like forged "User-Agent" headers or suspicious IP addresses, that can be suggestive of bot activity. For example, inconsistencies such as similar time intervals between events, anomalous timestamps, or unrealistic client agent 115 window sizes could result in bot classification. Additional rules may include detection of patterns like specific keywords in the "User-Agent" header.

The heuristics module 125 operates through conditional program code constructs, including if/then or case statements. If these heuristics cannot classify the client agent 115 as either human or bot, it is labeled as unknown. If a classification as human or bot is made, the network interaction data 250 and classification information are forwarded to the decision engine 150 for mitigation of bot activity or other action. If a classification as unknown is made, the network interaction data 250 is forwarded to a trained adversarial neural network 135.

At block 725, the processing device makes a second determination, based on a second classification of the client agent, that the client agent 115 in the unknown class, where the second classification is performed using a trained adversarial neural network 135. For example, the trained adversarial neural network 135 may be a semi-supervised generative adversarial network (SGAN). The SGAN may be trained to perform behavioral analysis and to classify each network interaction as a human, bot, or as unknown. If the classification of the event is as unknown, the classification process may continue with the next component.

At block 730, the processing device generates a graph representation of the first network interaction. For example, a web traversal (WT) graph may be constructed in which each node encapsulates aggregated web interaction data from a particular network session. In some examples, the network session is defined as a 30 minute sliding window preceding the most recent network interaction for a given client agent 115, but other definitions are possible. The nodes may encode aggregate information including the type of request, client agent 115 details, response codes, time of request, payload data, and other relevant HTTP headers corresponding to a particular URL or network location. Undirected edges in the graph can encode the sequential relationship between different web interactions and thus represent the transition or flow from one network resource (e.g., web page) to another. The nodes and edges of the WT graph can thus capture the client agent 115 behavior during the session.

At block 735, the processing device, based on the first classification and the second classification of the client agent 115 as in the unknown class, determines, based on a third classification of the client agent, that the client agent 115 is in a bot class, where the third classification is performed using the graph representation of the first network interaction and a trained graph convolutional neural network 140. For example, the trained graph convolutional neural network 140 may be a deep graph convolutional neural network (DGCNN). The SGAN may be trained to perform behavioral analysis and to classify each network interaction as a human, bot, or as unknown. If the classification of the event is as unknown, the classification process may continue with the next component.

However, in the event the classification of the event continues to be as unknown, the classification process may periodically continue by the trained graph convolutional neural network 140. For example, the trained graph convolutional neural network 140 may reattempt the classification as the input WT graph continues to grow based on newly received network interactions until a break condition is reached. In one example, the break condition can be the elapsing of a specified period of time in between received network interactions. In some examples, this duration may correspond to the sliding window of time corresponding to the WT graph under analysis. For instance, the WT graph may correspond to a sliding 30 minute session window, wherein the WT graph reflects all network interactions for the 30 minutes prior to the most recently received interaction.

At block 740, the processing device, based on the third classification of the client agent 115 as in the bot class, executes a command to cause a bot countermeasure. For example, the command may involve invoking program code to prevent, impede or respond to a classified web bot. The program code may correspond to actions like serving a CAPTCHA challenge, temporarily blocking an IP address, or throttling the request rate from the suspected bot.

In some examples, the specific countermeasure deployed may be determined based on the configured risk level. For instance, benign bots, such as search engine crawlers, may only cause countermeasures such as increased monitoring or limiting the crawling rate, preserving their functionality while preventing resource overuse. In contrast, malicious bots, identified through characteristics such as unusually high request rates or unwanted patterns indicative of data scraping, might prompt aggressive measures such as immediate IP blocking or sending falsified data to hinder their operations.

At block 745, the processing device generates a notification having information about the one or more characteristics of the client agent 115 and the one or more behaviors of the client agent 115. For example, the notification may include a real-time alert delivered to a system administrator via email or Short Messaging Service (SMS) that can include details about the client agent 115 or network interactions of the client agent. Alternatively, the notification may be a push notification to a mobile device, an automated message to a security information and event management system, an update to a live dashboard, or a message to a dedicated incident response channel on a chat platform. The notification may include key details like the client agent 115 IP address, detected behavioral patterns, and countermeasures deployed.

Computing Environment

Figure 8:
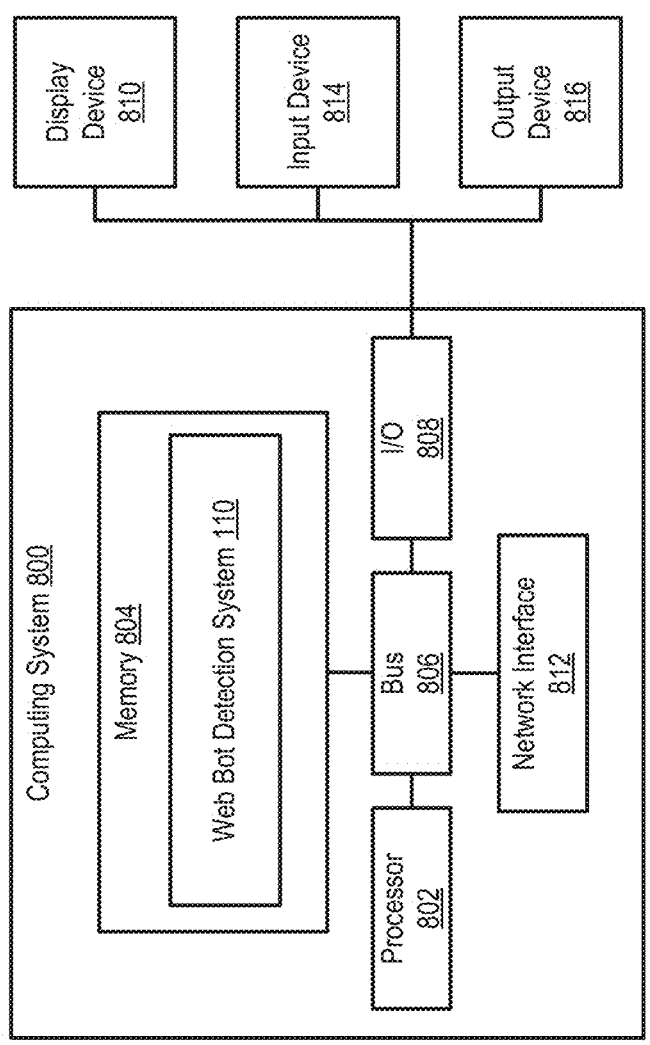
FIG. 8 depicts an example of a computer system that may be used for web bot detection using behavioral analysis and machine learning, according to some embodiments of the present disclosure.

Any suitable computer system or group of computer systems can be used for performing the operations described herein. For example, FIG. 8 depicts an example of a computer system 800. The depicted example of the computer system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing program code 806, program data 808, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 804 can be volatile memory, non-volatile memory, or a combination thereof.

The computer system 800 executes program code 806 that configures the processor 802 to perform one or more of the operations described herein. Examples of the program code 806 include, in various embodiments, the web bot detection subsystem 110 of FIG. 1, which may include any other suitable systems or subsystems that perform one or more operations described herein (e.g., one or more ML models, storage systems, controllers, or function-specific modules). The program code 806 may be resident in the memory device 804 or any suitable computer-readable medium and may be executed by the processor 802 or any other suitable processor.

The processor 802 is an integrated circuit device that can execute the program code 806. The program code 806 can be for executing an operating system, an application system or subsystem, or both. When executed by the processor 802, the instructions cause the processor 802 to perform operations of the program code 806. When being executed by the processor 802, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 804 store the program data 808 that includes one or more datasets described herein. In some embodiments, one or more of data sets are stored in the same memory device (e.g., one of the memory devices 804). In additional or alternative embodiments, one or more of the programs, data sets, models, and functions described herein are stored in different memory devices 804 accessible via a data network. One or more buses 810 are also included in the computer system 800. The buses 810 communicatively couple one or more components of a respective one of the computer system 800.

In some embodiments, the computer system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and/or the like. The computer system 800 is able to communicate with one or more other computing devices via a data network using the network interface device 812.

The computer system 800 may also include a number of external or internal devices, an input device 814, a presentation device 816, or other input or output devices. For example, the computer system 800 is shown with one or more input/output ("I/O") interfaces 818. An I/O interface 818 can receive input from input devices or provide output to output devices. An input device 814 can include any device or group of devices suitable for receiving visual, auditory, or other suitable input that controls or affects the operations of the processor 802. Non-limiting examples of the input device 814 include a touchscreen, a mouse, a keyboard, a microphone, a separate mobile computing device, etc. A presentation device 816 can include any device or group of devices suitable for providing visual, auditory, or other suitable sensory output. Non-limiting examples of the presentation device 816 include a touchscreen, a monitor, a speaker, a separate mobile computing device, etc.

Although FIG. 8 depicts the input device 814 and the presentation device 816 as being local to the computer system 800, other implementations are possible. For instance, in some embodiments, one or more of the input device 814 and the presentation device 816 can include a remote client-computing device that communicates with computing system 800 via the network interface device 812 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

General Considerations

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   receiving a first indication of a first network interaction by a client agent, wherein the client agent includes one or more characteristics;
   determining, based on the first network interaction, one or more behaviors of the client agent;
   making a first determination, by a heuristics module, based a first classification of the client agent, that the client agent is in an unknown class, wherein the first classification is based on the one or more characteristics of the client agent and the one or more behaviors of the client agent;
   making a second determination, by a trained adversarial neural network, based on a second classification of the client agent, that the client agent in the unknown class;
   generating a graph representation of the first network interaction;
   based on the first classification and the second classification of the client agent as in the unknown class, determining, by a trained graph convolutional neural network, based on a third classification of the client agent, that the client agent is in a bot class, wherein the third classification is performed using the graph representation of the first network interaction;
   based on the third classification of the client agent as in the bot class, executing a command to cause a bot countermeasure; and
   generating a notification comprising information about the one or more characteristics of the client agent and the one or more behaviors of the client agent.

2. The method of claim 1, wherein the trained adversarial neural network is a trained semi-supervised generative adversarial network (SGAN), comprising at least a generator, a discriminator, and a classifier.

3. The method of claim 2, wherein training the classifier of the SGAN comprises:
   accessing a dataset comprising a plurality of network interactions by a plurality of client agents;
   processing the dataset, by, for each of the network interactions in the plurality of network interactions:
      applying a heuristics-based filter to the network interaction; and
      based on the heuristics-based filtering, applying a label to the network interaction;
   generating, by the classifier, a fourth classification for each network interaction in a training portion of the dataset, wherein the fourth classification classifies each of the network interactions into at least one of a set of classes including human, bot, or unknown; and
   based on a first accuracy of the fourth classification, updating a configuration of one or more components of the classifier.

4. The method of claim 3, wherein training the discriminator of the SGAN comprises:
   generating, by the discriminator, a first likelihood associated with each of the network interactions in the training portion of the dataset;
   based on a second accuracy of the first likelihood, updating the configuration of one or more components of the discriminator;
   generating, by the generator, first generated training data, the first generated training data including one or more network interactions;
   generating, by the discriminator, a second likelihood associated with each of the network interactions in the first generated training data; and
   based on a third accuracy of the second likelihood, updating the configuration of the one or more components of the discriminator.

5. The method of claim 4, wherein training the generator of the SGAN comprises:
   generating, by the generator, second generated training data, the second generated training data including one or more of the network interactions;
   generating, by the discriminator, a third likelihood associated with each of the network interactions in the second generated training data; and
   based on a fourth accuracy of the third likelihood, updating the configuration of the one or more components of the discriminator or a configuration of one or more components of the generator.

6. The method of claim 1, wherein the trained graph convolutional neural network is a trained deep graph convolutional network (DGCNN).

7. The method of claim 6, wherein the trained DGCNN includes at least a graph convolution layer, a sort pooling layer, and one-dimensional convolutional neural network.

8. The method of claim 7, wherein training the trained DGCNN comprises:
   accessing a dataset comprising a plurality of network interactions by a plurality of client agents;
   processing the dataset, by, for each of the network interactions in the plurality of network interactions:
      applying a heuristics-based filter to the network interaction; and
      based on the heuristics-based filtering, applying a label to the network interaction;

generating one or more graph representations of the plurality of network interactions in the dataset;

generating, by the one-dimensional convolutional neural network, a fourth classification for each network interaction in a training portion of the dataset, wherein the fourth classification classifies each of the network interactions into at least one of a set of classes including human, bot, or unknown; and based on an accuracy of the fourth classification, updating a configuration of one or more components of the DGCNN.

9. The method of claim 1, wherein the graph representation is a website traversal graph.

10. The method of claim 9, wherein the website traversal graph includes one or more nodes, wherein each node:
corresponds to a webpage visited by the client agent;
includes information about the webpage visited by the client agent; and
includes a feature vector, the feature vector encoding at least one or more behaviors of the client agent and the information about the webpage visited by the client agent.

11. The method of claim 1, wherein the bot countermeasure includes at least one of:
restricting a network access of the client agent;
presenting a verification challenge to the client agent;
logging the one or more behaviors of the client agent; or
modifying a property of a network.

12. A system comprising, comprising:
a processing device; and
a memory device that includes instructions executable by the processing device for causing the processing device to perform operations comprising:
receiving a first indication of a first network interaction by a client agent, wherein the client agent includes one or more characteristics;
receiving a second indication of a second network interaction by the client agent;
determining, based on the first network interaction and the second network interaction, one or more behaviors of the client agent;
making a first determination, based a first classification of the client agent, that the client agent is in an unknown class, wherein the first classification is based on the one or more characteristics of the client agent and the one or more behaviors of the client agent;
making a second determination, based on a second classification of the client agent, that the client agent in the unknown class, wherein the second classification is performed using a trained adversarial neural network;
generating a graph representation of the first network interaction and the second network interaction;
based on the first classification and the second classification of the client agent as in the unknown class, determining, based on a third classification of the client agent, that the client agent is in a bot class, wherein the third classification is performed using the graph representation of the first network interaction and the second network interaction and a trained graph convolutional neural network;
based on the third classification of the client agent as in the bot class, executing a command to cause a bot countermeasure; and
generating a notification comprising information about the one or more characteristics of the client agent and the one or more behaviors of the client agent.

13. The system of claim 12, wherein the trained adversarial neural network is a trained semi-supervised generative adversarial network (SGAN), comprising at least a generator, a discriminator, and a classifier.

14. The system of claim 12, wherein the trained graph convolutional neural network is a trained deep graph convolutional network (DGCNN), wherein the trained DGCNN includes at least a graph convolution layer, a sort pooling layer, and one-dimensional convolutional neural network.

15. The system of claim 12, wherein the graph representation is a website traversal graph, wherein the website traversal graph includes one or more nodes, wherein each node:
corresponds to a webpage visited by the client agent;
includes information about the webpage visited by the client agent; and
includes a feature vector, the feature vector encoding at least one or more behaviors of the client agent and the information about the webpage visited by the client agent.

16. The system of claim 12, wherein the bot countermeasure includes at least one of:
restricting a network access of the client agent;
presenting a verification challenge to the client agent;
modifying a property of a network comprising one or more of:
associating a rate limit with the client agent;
throttling a network response to the one or more behaviors of the client agent; or
blocking an IP address of the client agent.

17. A non-transitory computer-readable medium comprising instructions that are executable by a processing device for causing the processing device to perform operations comprising:
making a first determination, by a trained adversarial neural network, that a client agent in an unknown class, wherein:
the trained adversarial neural network is a trained semi-supervised generative adversarial network (SGAN), comprising at least a generator, a discriminator, and a classifier; and
training the trained adversarial neural network comprises:
training the classifier;
training the discriminator; and
training the generator;
based on the first determination of the client agent as in the unknown class, making a second determination, by a trained graph convolutional neural network, that the client agent is in a bot class, wherein:
the trained graph convolutional neural network is a trained deep graph convolutional network (DGCNN) comprising at least a graph convolution layer, a sort pooling layer, and one-dimensional convolutional neural network; and
training the trained graph convolutional neural network comprises:
accessing a dataset comprising a plurality of network interactions by a plurality of client agents;
processing the dataset, by, for each of the network interactions in the plurality of network interactions:
applying a heuristics-based filter to the network interaction; and
based on the heuristics-based filtering, applying a first label to the network interaction;

generating one or more graph representations of the plurality of network interactions in the dataset;

generating, by the one-dimensional convolutional neural network, a classification for each network interaction in a training portion of the dataset, wherein the classification classifies each of the network interactions into at least one of a set of classes including human, bot, or unknown; and based on an accuracy of the classification for each network interaction, updating a configuration of one or more components of the DGCNN, based on the second determination of the client agent as in the bot class, executing a command to cause a bot countermeasure; and generating a notification comprising information about the first determination and the second determination.

18. The non-transitory computer-readable medium of claim 17, wherein training the classifier of the SGAN comprises:

accessing the dataset comprising the plurality of network interactions by the plurality of client agents;

processing the dataset, by, for each of the network interactions in the plurality of network interactions:
  applying the heuristics-based filter to the network interaction; and
  based on the heuristics-based filtering, applying a second label to the network interaction;

generating, by the classifier, a fourth classification for each network interaction in the of the dataset, wherein the fourth classification classifies each of the network interactions into at least one of the set of classes including human, bot, or unknown; and based on a first accuracy of the fourth classification, updating a configuration of one or more components of the classifier.

19. The non-transitory computer-readable medium of claim 17, wherein training the discriminator of the SGAN comprises:

generating, by the discriminator, a first likelihood associated with each of the network interactions in the training portion of the dataset;

based on a second accuracy of the first likelihood, updating the configuration of one or more components of the discriminator;

generating, by the generator, first generated training data, the first generated training data including one or more network interactions;

generating, by the discriminator, a second likelihood associated with each of the network interactions in the first generated training data; and based on a third accuracy of the second likelihood, updating the configuration of the one or more components of the discriminator.

20. The non-transitory computer-readable medium of claim 17, wherein training the generator of the SGAN comprises:

generating, by the generator, second generated training data, the second generated training data including one or more of the network interactions;

generating, by the discriminator, a third likelihood associated with each of the network interactions in the second generated training data; and based on a fourth accuracy of the third likelihood, updating the configuration of the one or more components of the discriminator or a configuration of one or more components of the generator.

* * * * *